United States Patent
Hall et al.

(10) Patent No.: US 7,673,214 B2
(45) Date of Patent: Mar. 2, 2010

(54) MESSAGE ERROR VERIFICATION USING CHECKING WITH HIDDEN DATA

(75) Inventors: Brendan Hall, Eden Prairie, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1314 days.

(21) Appl. No.: 10/993,162

(22) Filed: Nov. 19, 2004

(65) Prior Publication Data

US 2005/0149812 A1 Jul. 7, 2005

Related U.S. Application Data

(60) Provisional application No. 60/523,865, filed on Nov. 19, 2003.

(51) Int. Cl.
*H03M 13/00* (2006.01)
(52) U.S. Cl. .................. 714/758; 714/799; 714/703
(58) Field of Classification Search ............. 714/758, 714/799, 703, 48; 455/422; 360/48; 375/354
See application file for complete search history.

(56) References Cited

U.S. PATENT DOCUMENTS

| | | |
|---|---|---|
| 4,654,480 A | 3/1987 | Weiss |
| 5,930,706 A * | 7/1999 | Raith ................. 455/422.1 |
| 6,112,319 A * | 8/2000 | Paulson ................. 714/49 |
| 6,278,755 B1 * | 8/2001 | Baba et al. .............. 375/360 |
| 6,606,360 B1 * | 8/2003 | Dunning et al. .......... 375/354 |
| 2003/0039047 A1 * | 2/2003 | Ottesen et al. ............ 360/48 |
| 2004/0057145 A1 * | 3/2004 | Fung et al. ............... 360/39 |

FOREIGN PATENT DOCUMENTS

| | | |
|---|---|---|
| WO | WO 02/13393 A2 | 2/2002 |
| WO | WO 02/35761 A2 | 5/2002 |
| WO | WO 03/030437 A2 | 4/2003 |

OTHER PUBLICATIONS

Irvin, "Embedding a secondary communication channel transparently within a cyclic redundancy check (CRC)", IBM Journal of Research and Development, vol. 45, No. 6, Nov. 2001, XP002325049.

* cited by examiner

*Primary Examiner*—Scott T Baderman
*Assistant Examiner*—Fritz Alphonse
(74) *Attorney, Agent, or Firm*—Fogg & Powers LLC (57) ABSTRACT

A method of verifying the accuracy of blocks of data. In one embodiment, a method of verifying the accuracy of data in a message that includes a checking mechanism with hidden data is provided. The method comprises observing two or more initial messages. Comparing the residual error of each of the observed initial messages. If the residual errors of at least two of the initial messages match each other, storing the matched residual error. For subsequent messages, comparing residual errors of the subsequent messages with the stored matched residual error.

18 Claims, 5 Drawing Sheets

MESSAGE ERROR VERIFICATION USING CHECKING WITH HIDDEN DATA

CROSS REFERENCE TO RELATED APPLICATIONS

This application is related to and claims the benefit of the filing date of U.S. Provisional Application No. 60/523,865, filed on Nov. 19, 2003, which is incorporated herein by reference.

TECHNICAL FIELD

The present invention relates generally to communication of data and in particular to a method of verifying the accuracy of data.

BACKGROUND

In data communication systems that require the detection (and possibly correction) of errors in the data transmission, the data is typically divided into units over which independent error checking is done. These units could be frames, messages, packets, or blocks; and often, these terms are used synonymously.

A method of checking for errors in data blocks is by incorporating a checking mechanism such as a cyclic redundancy checking protocol. Such a protocol uses a CRC code (or CRC) that is generated from each data block of data at a transmission end by a transmitting device. The CRC code has properties well known in the art. The transmitting device calculates the value of the CRC code and appends it to its associated data block. At the receiving end, a receiving device makes a similar calculation on the data block and compares it with the received CRC code. If the received and calculated CRC codes match, the data block is considered to be error free. If the codes do not match, an error has been detected. Alternatively, and with the same effect, a receiver can perform a CRC calculation over the received message and its appended CRC code: and then, compare the results against a constant (typically zero) with a mismatch indicating a message error.

Another common method of checking for errors in data blocks is by incorporating a checksum. This behaves the same as a CRC except that the mathematics used to calculate the check code is modular integer addition over the block rather than the CRC's division of the block by a Galois field of two polynomial. There are additional error checking methods in use or which are possible that create redundant data via some mathematical operations over a block of data.

Some communication protocols utilize a CRC that covers not only the contents of the data block but also an additional constant data that is not transmitted (hidden data). That is, in this protocol, the CRC is calculated based on each packet of data (block of data) and the hidden data. This hidden data, however, can provide problems for receivers receiving a block of data with a CRC that is calculated based not only on the data but also hidden data when the receiver does not have knowledge of the hidden data. These receivers cannot determine the correctness of the CRC of a received message or distinguish between packet corruption during transmission or source data corruption if there is an error. Similarly, the hidden data can also provide a problem for diagnostic testing of blocks of data in a bus. That is, test equipment used to monitor the blocks of data in a bus will not be able to accurately test the reliability of the CRC if the CRC includes hidden data that the test equipment does not know about. Moreover, having to determine what the hidden data is using current methods and then having to program the test equipment to take the hidden data into consideration is difficult and inefficient. All of the error checking methods that create redundant data via some mathematical operations over a block of data can hide data in a manner similar to the CRC method.

In some time-triggered communication systems, each node is required to have instructions for communications that controls behaviors such as time triggering and synchronization so each node knows how to communicate with the other nodes. The instructions are typically given to the nodes through a table. The tables are occasionally updated and identified by their version number. For proper communication between nodes, the same version of the table must be used between nodes. Therefore, it is important for each node to know which version of the table to use. One method of ensuring that each node is using the same version of table is by explicitly sending (i.e. dedicating a bit or bits in a block of data) over a communication signal that can be read and verified by the nodes in communication. This however, reduces the possible bandwidth for sending data since one or more bits are designated as a table identifier. Another method is to put the table version in a message as hidden data. However, if the table identifier bits are incorrect, an incorrect version of the table will be identified and errors in the communications between the nodes will occur. The possibility of incorrect table bits leading to incorrect table use occurs both in the explicitly sending methods and the hidden data methods currently practiced in the art. In addition, the hidden data method as practiced in the art can't distinguish between message data errors and incompatible table versions.

In addition, current practices require the explicit sending of communication related schedule position data in order to facilitate the integration or re-integration of powering-up or recovering nodes. This requires dedicated bandwidth to be consumed with such data and lowers network efficiency. Also, if this data is not sent in every transmission, the frames carrying such data need to be differentiated from frames not carrying such data. The requirement for differentiation leaves the frame vulnerable to errors of invalid frame type identifiers.

For the reasons stated above and for other reasons stated below which will become apparent to those skilled in the art upon reading and understanding the present specification, there is a need in the art for a method of providing message validity checking using hidden data even if the hidden data is not known or is incompatible between transmitters and receivers and a need for extraction of the value of the hidden data directly from the message stream without the expense of an alternate path to convey the hidden data.

SUMMARY

The above-mentioned problems and other problems are resolved by the present invention and will be understood by reading and studying the following specification.

In one embodiment, a method of verifying the accuracy of data in a message that includes hidden data is provided. The method comprises observing two or more initial messages. Calculating the residual error of each of the observed initial messages. Comparing the residual error of each of the observed initial messages and if the residual errors of at least two of the initial messages match each other, storing the matched residual error.

In another embodiment, a method of verifying the integrity of messages with hidden data in a communication system is provided. The method comprises observing a first message.

Calculating the residual error of the first message. Observing a second message. Calculating the residual error of the second message. Comparing the residual error of the first message with the residual error of the second message. If the residual error of the first message matches the residual error of the second message, storing the matched residual error and verifying subsequent messages as error free if their respective residual error matches the stored residual error.

In yet another embodiment, a testing tool for validating messages in communication system is provided. The testing tool comprises a receiver and control circuitry. The receiver is adapted to selectively receive data blocks traveling through the communication system. The control circuitry is adapted to observe two or more of the data blocks and determine hidden data in each of the observed data blocks. The control circuitry is further adapted to verify the accuracy of data blocks based on comparisons of the hidden data.

In still further another embodiment, a machine readable medium having instructions stored thereon for verifying the accuracy of data in a data block that includes error checking data that is based on the data in the data block and hidden data is provided. The machine readable medium instructions comprise observing two or more initial data blocks. Comparing the residual error of each of the observed initial data blocks. If the residual errors of at least two of the initial data blocks match each other, storing the matched residual error and for subsequent data blocks, comparing residual errors of the subsequent data blocks with the stored, matched residual error.

In further another embodiment, a method of operating a communication system is provided. The method comprises applying a checking protocol to a first data block to determine a first hidden data in the first data block. Applying a checking protocol to a second data block to determine a second hidden data in the second data block and verifying the accuracy of the first and second data blocks by comparing the first hidden data with the second hidden data.

In another embodiment, a method of hiding data in a CRC is provided. This method comprises selecting data to be hidden that is no larger than the size of the CRC. Calculating the CRC of the data block to be transmitted. XOR'ing the hidden data into the cyclic redundant check (CRC) field for the data block.

In yet another embodiment, a method of hiding data in a checksum is provided. This method comprises selecting data to be hidden that is no larger than the size of the checksum. Calculating the sum of the data block to be transmitted. Adding the hidden data into the checksum field for the data block.

In another embodiment, a method of tentative integration in a multi-node communication system is provided. The method comprises placing hidden data representative of a schedule position on a transmitted frame with a first checking mechanism and determining the hidden data of received frames with a second checking mechanism. Then verifying the accuracy of the hidden data by requiring a F+1 frames in agreement among the received frames to tolerate F frames with faulty schedule position data. Finally, using the verified schedule position data for an unsynchronized receiver to integrate or synchronize with the current set of nodes that are synchronized.

In yet another embodiment, a communication system is provided. The communication system comprises a first node and a second node. The first node has a data hiding circuit. The second node has a circuit is to retrieve the hidden data from the data blocks. Moreover, the second circuit is adapted to verify the integrity of the data blocks by comparing the hidden data in two or more data blocks.

In finally another embodiment, a machine readable medium having instructions stored thereon for verifying the accuracy of data in a data block that includes a check field that is based on the data in the data block and hidden data is provided. The machine readable medium instructions comprises observing two or more data blocks. Determining the hidden data in each of the two or more data blocks. Comparing the hidden data of each of the observed data blocks and when the difference between two of the data blocks is an expected amount, verifying the accuracy of the data blocks.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of verifying the integrity of a block of data (or message) and determining the value of the hidden data. Embodiments of the present invention utilize the fact that residual error from a checking protocol such as a cyclic redundant check (CRC) protocol will be the same between different error free messages or differ by a known relationship. Accordingly, after observing at least one error free message, a subsequent message that has an identical residual error (or a known relationship) can be verified as being an error free message. Other embodiments of the present invention include a method of recovering the hidden data. Further, other embodiments of the present invention include a method of determining a location in a sequential data stream with the use of recovered hidden data.

Figure 1:
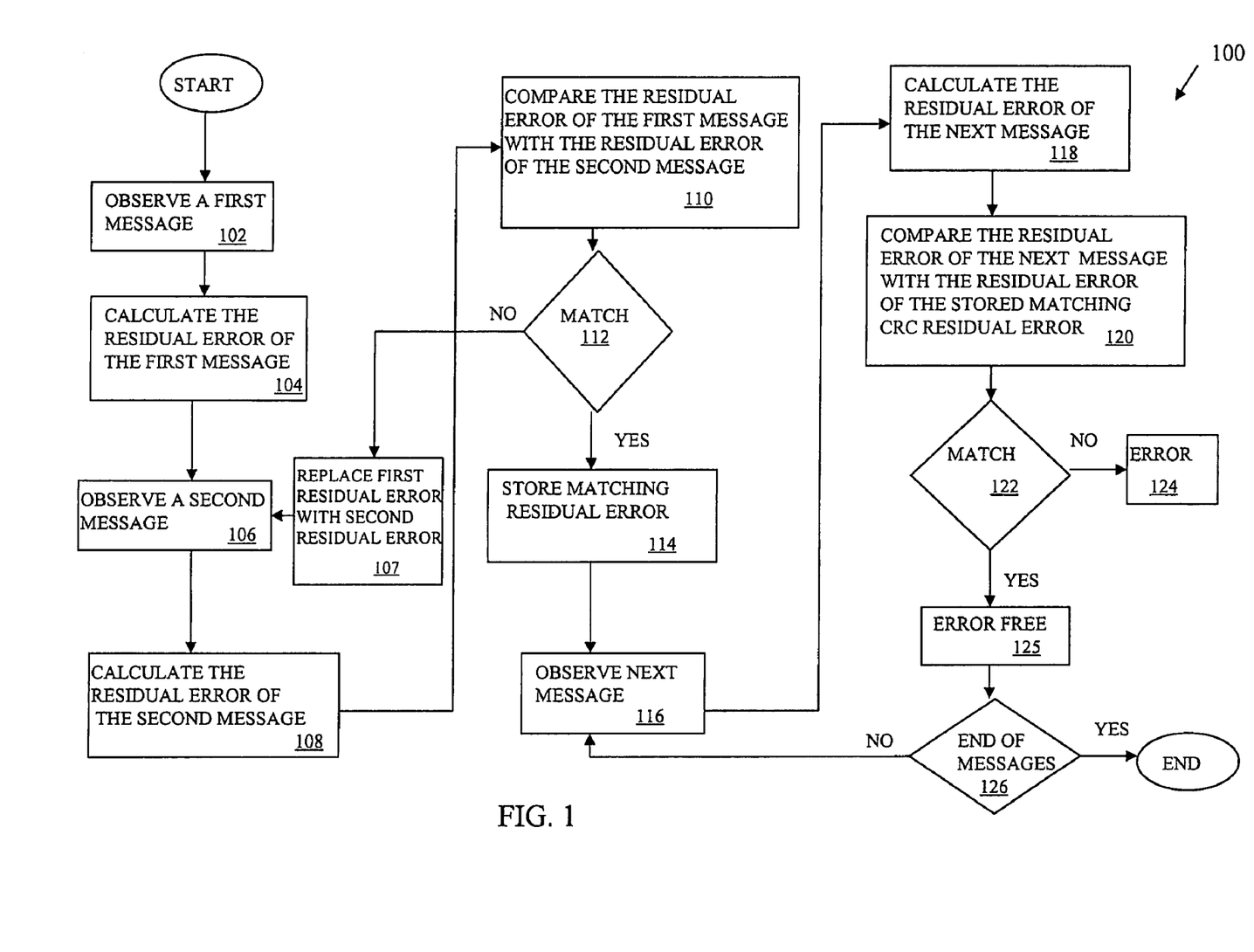
FIG. 1 is a flow chart illustrating one method of one embodiment of the present invention.

FIG. 1, illustrates a flow chart 100 of one embodiment of the present invention. As illustrated, a first message (or first data block) is observed (102). In one embodiment this is done with a tester that has tapped into a bus that is in communication with two nodes. The first residual error of the first message is calculated (104). The first residual error can be generally referred to as residual error or hidden data. In one embodiment, this done by first determining the CRC value of the data in the first message by running a CRC circuit over the message (or block of data) to determine the actual CRC value of the data and then determining the difference between the determined CRC value and the received CRC value. A second message is then observed (106). The residual error of the second message is then calculated (108). The residual error of the first message is then compared to the residual error of the second message (110). If they do not match (112), the first residual error of the first message is replaced with a second residual error of the second message (107) and a different second message is observed at 106 and the process continues as illustrated in flow chart 100. If the first residual error of the first message matches the second residual error of the second message (112), the matching residual error is stored in a memory (114). In another embodiment (not shown), the residual error of two or more initial messages are observed and compared. In this embodiment, when at least two residual errors match, the matched residual error is stored in the memory. In another embodiment, an M-out-of-N vote of the first N messages is used to determine the correct hidden data (or residual error).

Referring back to flow chart 100 of FIG. 1, once a matched residual error has been stored (114), the next message is observed (116). The residual error of the next message is then calculated (118). The residual error of the next message is then compared with matched residual error stored in the memory (118). If there is no match at 122, it is determined that an error has been detected in the next message (124). If there is a match at 122, it is determined that the next message is error free (125). Further in this embodiment, it is then determined if this is the end of the messages (126). If it is determined to be the end of the messages at 126, the testing ends. If it is determined that it is not the end of the messages (126), the next message is observed at 116 and the process continues as illustrated in the flow chart 100.

Figure 2:
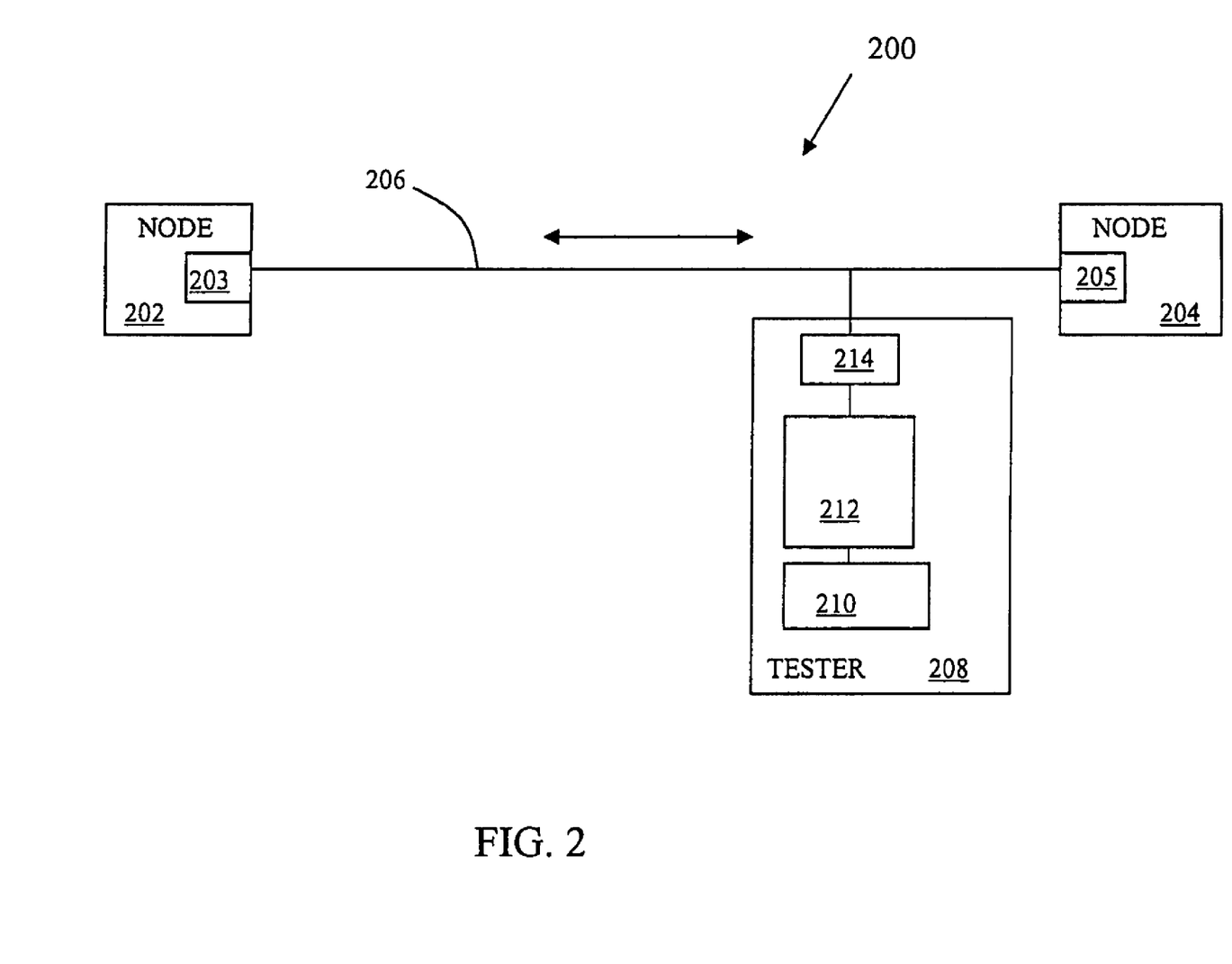
FIG. 2 is a block diagram of a tester of one embodiment of the present invention.

Referring to FIG. 2, an example of a testing system 200 of one embodiment of the present invention is illustrated. As illustrated, a tester 208 is selectively coupled to a bus 206 that is in communication with nodes 202 and 204. Each node 202 and 204 has a respective transceiver/receiver 203 and 205 to transmit and receive messages (blocks of data or data blocks) over the bus 206. The tester 208 includes a receiver 214, control circuitry 212 and a memory 210. The receiver 214 is adapted to observe messages on the bus 206. The control circuitry 212 is used to control the functions of the tester 208. The memory 210 stores matched residual error data. In particular, the control circuitry is adapted to compare residual errors of initial messages observed and to store matched residual error in the memory 210. In addition, the control circuitry is adapted to verify error free subsequent messages by comparing residual errors of the subsequent messages with the stored matched residual error. In one embodiment, system 200 uses the process illustrated in FIG. 1 to test the messages transmitted on bus 206.

Figure 3:
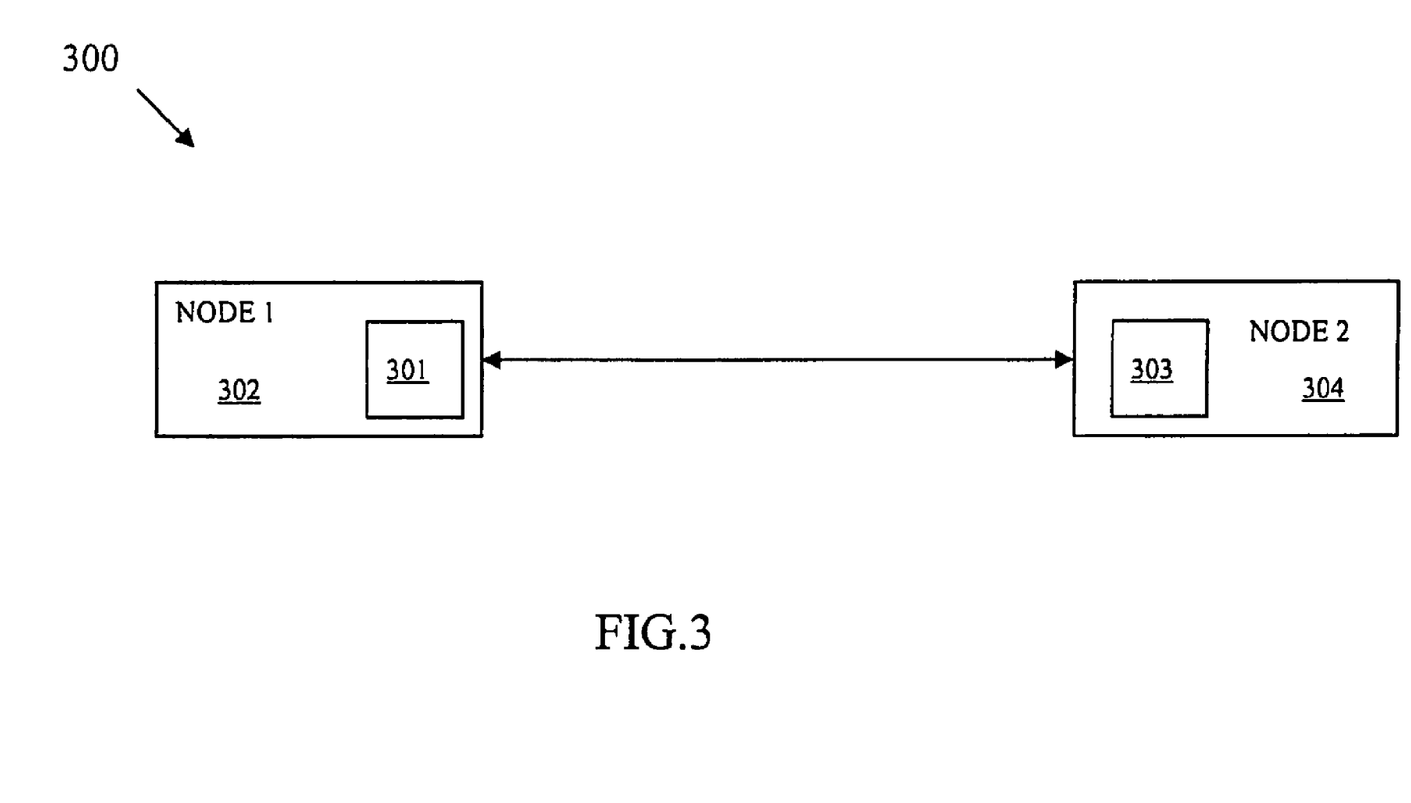
FIG. 3, is a block diagram of a communication system of one embodiment of the present invention.

FIG. 3 illustrates the communication between nodes 302 and 304 in a communication system 300 of one embodiment of the present invention. In the embodiment of FIG. 3, each node 302 and 304 contains a CRC circuit 301 and 303 respectively. The CRC circuits 301 and 303 are adapted to apply and read CRC protocol. By using the CRC protocol, the nodes are able to communicate with each other and determine hidden data such as table versions and locations in a sequential data stream. In the table version embodiment, an explicit broadcast of a table identifier that takes up bandwidth is not needed. The table identifier is simply incorporated as hidden data in the CRC process and read as illustrated in the embodiment of FIG. 1.

Figure 4:
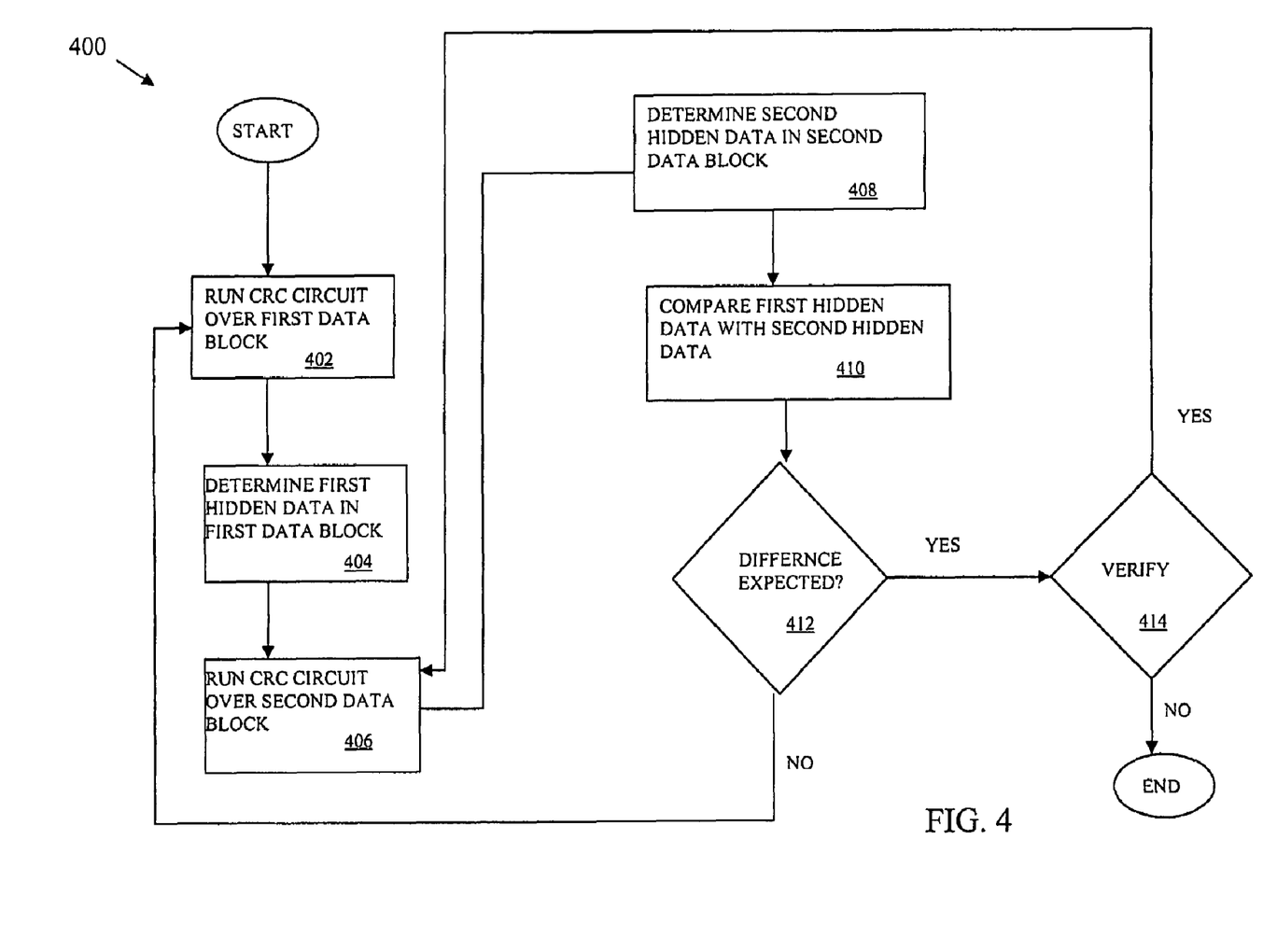
FIG. 4 is flow chart of one embodiment of the present invention.

As indicated above, the hidden data need not be the same for each data block. The hidden data may change be a predetermined amount. That is, the hidden data must be coherent to itself. For example, in a time division multiple access (TDMA) scheme that uses time slots to multiplex data from different sources on to a shared medium, the hidden data may be used to determine the location of a time slot in a TDMA transmission sequence. In this embodiment, the hidden data correlates to the location of its associated data block in the sequential data stream. This location can be identified by an expected sequence number (the sequence number that this message would have in error free operation), time of day, identity of the node that is transmitting, etc. FIG. 4 illustrates a varying hidden data flow chart 400 of one embodiment of the present invention. This example of an embodiment of the present invention starts by running a CRC circuit over a first data block (402) to determine a first hidden data (404). The CRC circuit is then run over a second data block (408), to determine a second hidden data (410). The first hidden data is compared with the second hidden data (410). It is then determined if the difference between the first hidden data and the second hidden data is an expected difference (412). If it is not the expected difference (412), the process starts over at (402). If the difference between the first and second hidden data is the expected difference (412), the result can be verified (414). The result is verified by running the CRC circuit over a second different data block (406) to determine a second different hidden data (408). This second different hidden data is then compared with the first hidden data (410). If this does not produce the expected result (412), the process starts over at (402). If this produces the expected result (412), the result is verified (414) and the process ends. The expected difference is determined by communication parameters in the communication system. For example, in the example where the data blocks are sequentially numbered via hidden data, if one knows the rate of speed of the data blocks in a data stream and how much time has passed in the sequential data stream between the first hidden data in a first data block and a second hidden data in a second data block the expected difference can be determined.

Embodiments of the present invention also allow for the determination of the location of a data block in a sequence of data blocks. For example, if the hidden data incorporated in a CRC in a data block includes information regarding location of the data block with respect to other data blocks in a sequence of data, the recovering of that hidden data will tell you the location of the data block in respect to the sequence of data. Classical TDM access communication systems track the location of data blocks in a stream of sequential data by bandwidth consuming information like marker messages. With the present invention, a way of presenting sequencing information is provided without consuming additional bandwidth.

Figure 5:
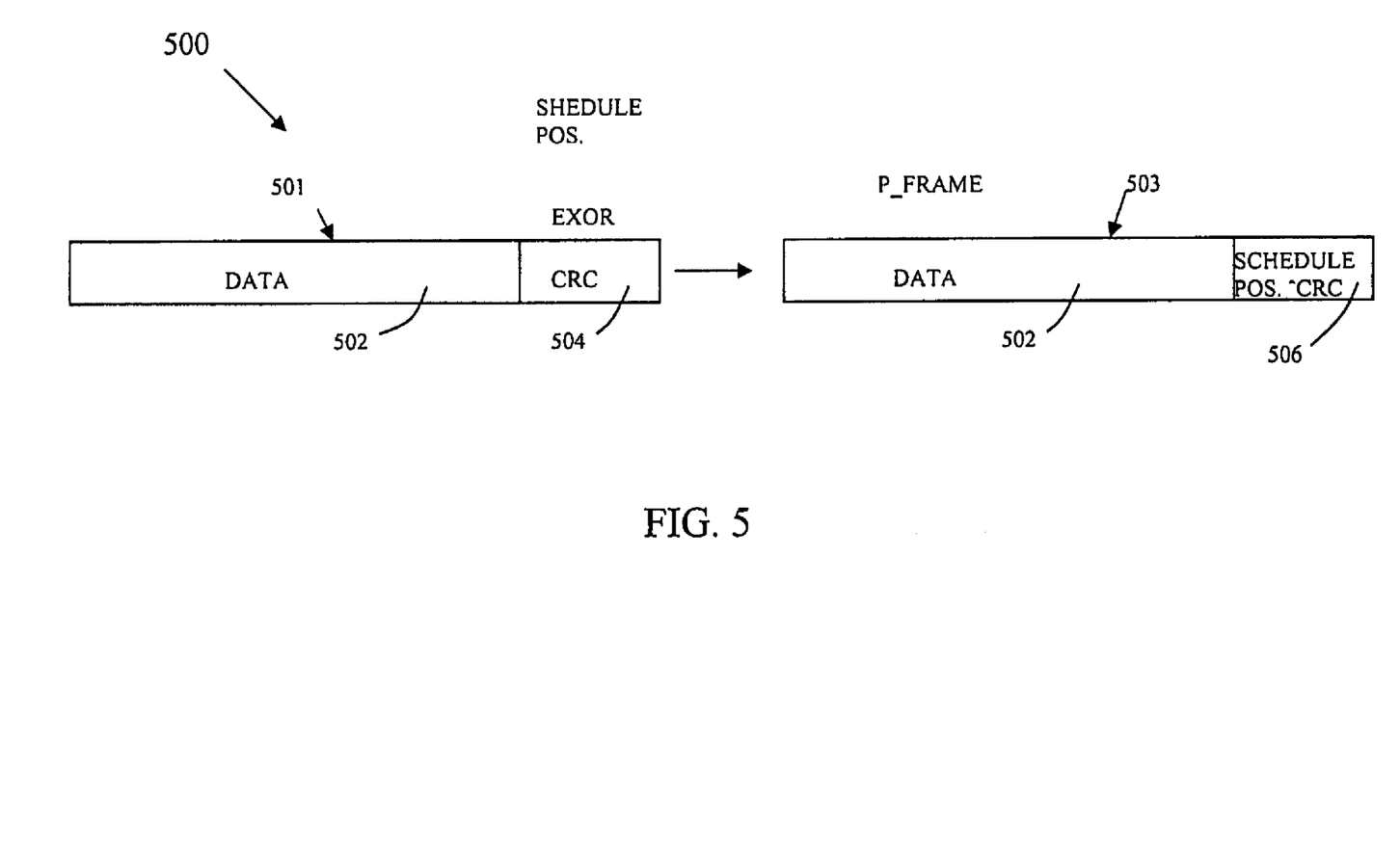
FIG. 5 is an illustration of a P-Frame of one embodiment of the present invention.

Referring to FIG. 5, an example of a P-Frame format and its subsequent usage of one embodiment of the present invention. As illustrated, a CRC process 500 that incorporates the schedule position in a P-Frame in a sequential data stream of one embodiment of the present invention is illustrated. A data block 501 (or frame 501) includes a data field and a check field 504 (or CRC field 504 in this embodiment). In this embodiment, a schedule position of the data block 502 is simply XOR'd (exclusive or function) into the protocol CRC field 504 to produce a scheduled position ^CRC field 506 in the P-Frame data block 503. A receiving node then uses the knowledge that the hidden data produced by a CRC circuit is the scheduled position and in one embodiment the hidden data in two or more frames from different sources are processed to confirm correctness. Different sources are used to tolerate faults in sources. That is, a receiving node that does not know the schedule position will tentatively except the first hidden data it sees but not act upon the data until it is confirmed by one or more subsequent frames from different sources having hidden data consistent with the first. Or, more generally, such receiving node will require an M-out-of-N agreement among the first N messages. In one embodiment, the accuracy of the hidden data is verified by requiring a F+1 frame agreement among received messages to tolerate F frames with faulty schedule position data. A verified schedule position for an unsynchronized receiver is used to integrate or synchronize with a current set of nodes that are already synchronized in a communication system.

This is a simple yet effective solution that enables tentative integration without sending an explicit state that requires additional bandwidth. In one embodiment, the schedule position (i.e. the hidden data) may have its own integrity key attached (i.e. dedicated checksum CRC). For example, in a 32 bit hidden data this could be used as 16 bits hidden data and 16 bits inverse hidden data or 24 bits hidden data and an 8 bit error detection code (checksum, CRC). In this embodiment, any message that has a bad integrity key for the hidden data can be discarded from the comparison or voting. In the embodiment that uses the CRC process 500, the hidden data is no longer than the size of the CRC. Moreover in a checksum embodiment, the hidden data is not larger than the size of the checksum.

As stated above, the methods and techniques described here are implemented by the tester 208 of FIG. 2 and the CRC circuits 301 and 303 of FIG. 3. Embodiments of the tester 208 and CRC circuits 301 and 303 may be implemented in digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions from a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. For example, the concepts provide herein relating to CRC also apply to other checking mechanisms such as checksum. This application is intended to cover any adaptations or variations of the present invention. Therefore, it is manifestly intended that this invention be limited only by the claims and the equivalents thereof.

The invention claimed is:

1. A method of verifying accuracy of data in a message that includes hidden data, the method comprising:
   observing two or more initial messages;
   calculating a residual error of each of the observed initial messages;
   comparing the residual error of each of the observed initial messages; and
   if the residual errors of at least two of the initial messages match each other, storing the matched residual error;
   calculating residual errors of subsequent messages;
   comparing the residual errors of the subsequent messages with the stored, matched residual error; and
   verifying the accuracy of the subsequent messages whose residual errors match the stored, matched residual error.

2. The method of claim 1, wherein each message is a block of data in a time division multiplexed system.

3. The method of claim 1, wherein a residual error is the difference between a cyclic redundant checking (CRC) value attached to a message and a CRC value calculated from the data in the message.

4. The method of claim 1, further comprising:
   indicating an error state when residual errors of the subsequent messages do not match the stored residual error.

5. A method of verifying integrity of messages with hidden data in a communication system, the method comprising:
   observing a first message;
   calculating a residual error of the first message;
   observing a second message;
   calculating a residual error of the second message;
   comparing the residual error of the first message with the residual error of the second message;
   if the residual error of the first message matches the residual error of the second message, storing the matched residual error; and
   verifying subsequent messages as error free if their respective residual error matches the stored residual error.

6. The method of claim 5, further comprising;
   if the residual error of the second message does not match the residual error of the first message, observing a different second data message;
   comparing the residual error of the second message with the residual error of the different second message; and
   if the residual error of the second message matches the residual error of the different second message, storing the matched residual error.

7. The method of claim 5, further comprising:
   if the residual error of a subsequent message does not match the residual error of the stored residual error, indicating that an error has been detected.

8. The method of claim 5, wherein calculating the residual error of the first and second messages further comprises:
   determining the difference between a cyclic redundant checking (CRC) value attached to the respective first and second messages and the actual CRC value of the data in the respective first and second messages.

9. The method of claim 5, further comprising:
observing subsequent messages; and
calculating the residual errors of the subsequent messages.

10. The method of claim 9, further comprising:
determining the end of the subsequent messages.

11. A machine readable medium having instructions stored thereon for verifying accuracy of data in a data block that includes error checking data that is based on the data in the data block and hidden data, the machine readable medium instructions comprising:
observing two or more initial data blocks;
comparing residual errors of each of the observed initial data blocks;
if the residual errors of at least two of the initial data blocks match each other, storing the matched residual error;
for subsequent data blocks, comparing residual errors of the subsequent data blocks with the stored, matched residual error; and
verifying the accuracy of the data in subsequent data blocks whose residual errors match the stored matched residual error.

12. The machine readable medium instructions of claim 11, further comprising:
calculating the residual error of each of the observed initial data block; and
calculating the residual error of each of the subsequent data block.

13. The machine readable medium instructions of claim 11, wherein each data block is a block of data in a time division multiplexed system.

14. The machine readable medium instructions of claim 11, wherein a residual error is the difference between a cyclic redundancy check (CRC) value attached to a data block and an actual CRC value based on the data of the data block.

15. The machine readable medium instructions of claim 11, further comprising:
indicating an error state when residual errors of the subsequent data blocks do not match the stored residual error.

16. The machine readable medium instructions of claim 15, wherein indicating when residual errors of the subsequent data blocks have errors, further comprises:
calculating residual errors of the subsequent data blocks;
comparing the residual errors of the subsequent data blocks with the stored matched residual error; and
determining those residual errors of the subsequent data blocks that do not match the stored matched residual error.

17. A machine readable medium having instructions stored thereon for verifying accuracy of data in a data block that includes a check field that is based on the data in the data block and hidden data, the machine readable medium instructions comprising:
observing two or more data blocks;
determining respective hidden data in each of the two or more data blocks;
comparing the respective hidden data of each of the observed data blocks to one another;
when the difference between the respective hidden data of two of the data blocks differs by a predetermined amount, verifying the accuracy of the data blocks; and
determining the schedule position of each data block based on the data blocks associated hidden data.

18. The machine readable medium instructions of claim 17, further comprising:
XOR'ing an associated schedule position into the check field in each data block.

* * * * *

UNITED STATES PATENT AND TRADEMARK OFFICE
CERTIFICATE OF CORRECTION

| | | |
|---|---|---|
| PATENT NO. | : 7,673,214 B2 | Page 1 of 1 |
| APPLICATION NO. | : 10/993162 | |
| DATED | : March 2, 2010 | |
| INVENTOR(S) | : Hall et al. | |

It is certified that error appears in the above-identified patent and that said Letters Patent is hereby corrected as shown below:

At Claim 17, Column 10, Line 28, replace "blocks" with --block's--.

Signed and Sealed this
Fourteenth Day of June, 2011

David J. Kappos
*Director of the United States Patent and Trademark Office*